(12) United States Patent
Goronzy et al.

(10) Patent No.: US 7,970,762 B2
(45) Date of Patent: *Jun. 28, 2011

(54) METHODS TO CREATE A USER PROFILE AND TO SPECIFY A SUGGESTION FOR A NEXT SELECTION OF A USER

(75) Inventors: Silke Goronzy, Erlangen (DE); Ralf Kompe, Rottenbach (DE); Christian Hying, Stuttgart (DE); Zica Valsan, Stuttgart (DE); Robert Mencl, Dortmund (DE); Helmut Wais, Tapfheim (DE); Thomas Kemp, Esslingen (DE); Sunna Torge, Freiberg (DE); Martin Emele, Bad Homburg (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/507,574

(22) Filed: Jul. 22, 2009

(65) Prior Publication Data

US 2009/0282034 A1  Nov. 12, 2009

Related U.S. Application Data

(63) Continuation of application No. 10/525,665, filed as application No. PCT/EP03/09473 on Aug. 27, 2003, now Pat. No. 7,593,921.

(30) Foreign Application Priority Data

Aug. 30, 2002 (EP) .................................. 02019492

(51) Int. Cl.
*G06F 17/30* (2006.01)

(52) U.S. Cl. ........ 707/732; 707/723; 707/733; 707/734; 707/735; 725/46; 725/44; 725/39

(58) Field of Classification Search .................. None
See application file for complete search history.

(56) References Cited

U.S. PATENT DOCUMENTS 5,754,939 A  5/1998  Herz et al.
(Continued)

FOREIGN PATENT DOCUMENTS

EP  1 189 437 A2  3/2002
(Continued)

OTHER PUBLICATIONS

Cetintemel U et al: "Self-adaptive user profiles for large-scale data delivery" Data Engineering, 2000. Proceedings. 16th International Conference on San Diego, CA USA Feb. 29-Mar. 3, 2000, Los Alamitos, CA, USA, IEEE Comput. Soc, US, Feb. 29, 2000, pp. 622-633, XP010378759.

(Continued)

*Primary Examiner* — Baoquoc To
(74) *Attorney, Agent, or Firm* — Oblon, Spivak, McClelland, Maier & Neustadt, L.L.P.

(57) ABSTRACT

A user profile and/or the suggestions computed based thereon are obtained taking a special set of user features into account. The user features are defined to represent a typical general behaviour of an individual user in respect to the application where the user profile is used. In other words, for each application where a user profile is used a special set of user features are defined which are able to represent a typical general behaviour of an individual user. Based on these user features the weights in the list of word-weight pairs or weighted keywords which represents the user profile are computed or influenced during the creation of the user profile, and/or a mufti-user profile is split during the creation of an individual user profile from a mufti-user profile, and/or during specification of a suggestion a user history which is used to create the user profile, and/or the user profile, and/or the suggestion results are filtered.

39 Claims, 10 Drawing Sheets

| Available profiles | News profile | Sport Profile | Thriller profile | Classical Music | | Generic /average user profile | User Specific | |
|---|---|---|---|---|---|---|---|---|
| Associated weights | 0 | 0 | 0 | 0 | ----- | 1.0 | 0 | Start, t = 0 |
| | 0 | 0.03 | 0.01 | 0.06 | | 0.9 | 0 | After t = a few hours |
| | 0.03 | 0.09 | 0.01 | 0.07 | | 0.7 | 0.1 | After t = 1 day |
| | | | | | ----- | | | |
| | 0.05 | 0.1 | 0.05 | 0.2 | | 0.1 | 0.5 | After t = 1 week |
| | | | | | ----- | | | |
| | 0 | 0 | 0 | 0 | ----- | 0 | 1 | After t = several months |

Watching time t

U.S. PATENT DOCUMENTS

| | | |
|---|---|---|
| 6,859,803 B2 | 2/2005 | Dagtas et al. |
| 7,243,105 B2 | 7/2007 | Thint et al. |
| 7,290,029 B2 | 10/2007 | Tang et al. |
| 2001/0047357 A1* | 11/2001 | Vaithilingam et al. ........ 707/100 |
| 2002/0056091 A1 | 5/2002 | Bala et al. |
| 2002/0174429 A1* | 11/2002 | Gutta et al. ..................... 725/46 |
| 2003/0126108 A1 | 7/2003 | Martino et al. |
| 2003/0151621 A1* | 8/2003 | McEvilly et al. ............. 345/744 |

FOREIGN PATENT DOCUMENTS

| | | |
|---|---|---|
| WO | WO 02 25939 | 3/2002 |
| WO | WO 02/067578 A2 | 8/2002 |

OTHER PUBLICATIONS

Wilkinson R et al.: "Similarity Mesures for Short Queries" Fourth Text Retrieval Conference (TREC-4), Nov. 1, 1995, pp. 277-285, XP002244000.

Shapira B et al: "Stereotypes in information filtering systems" Information Processing & Management, Elsevier, Barking, GB, vol. 33, No. 3, May 1, 1997, pp. 273-287, XP004091801.

Michael Ehrmantraut, et al., "The Personal Electric Program Guide—Towards the Pre-selection of individual TV Programs", Proceedings of the International Conference on Information and Knowledge Management CIKM, XP002071337, Nov. 12, 1996, pp. 243-250.

* cited by examiner

Fig. 3a.

Theoretic approach:

```
Read History: get of articles
```

↓

```
for each term t {
  for each article i of history {
    w(i,t) = imp(i,t) * imp(S,t)
           * imp(D,t) * corr(i,t);
  }
}
```

↓

```
compute average of w(i,t) => w(t)
```

↓ …

Concrete example:

Article 1: pop music rock madonna music...
Article 2: beethoven symphony mozart classic...
Article 3: punk rock music...
Article 4: classic philharmonic music...

|         | Art. 1      | Art. 2    | Art. 3    | Art. 4    |
|---------|-------------|-----------|-----------|-----------|
| music   | 1.2*1*0.9   | 0*..      | 1*1*1*0.8 | 1*1*1*0.8 |
| classic | 0*..        | 1*1*1*0.4 | 0*..      | 1*1*1*0.7 |
| rock    | 1*1*1*0.7   | 0*..      | 1*1*1*0.8 | 0*..      |
| pop     | 1*1*1*0.5   | 0*..      | 0*..      | 0*..      |
| ...     |             |           |           |           |

|         | w(t)                                |
|---------|-------------------------------------|
| music   | (1.08 + 0.0 + 0.8 + 0.8 )/ 4 = 0.67 |
| classic | (0.0 + 0.4 + 0.0 + 0.7)/ 4  = 0.275 |
| rock    | (0.7 + 0.0 + 0.8 + 0.0)/ 4  = 0.375 |
| pop     | (0.5 + 0.0 + 0.0 + 0.0)/ 4  = 0.125 |
| ...     |                                     |

Fig. 3b       Concrete example:

Theoretic approach:

...  →  UserProfile = Set of all terms of the history with weights music 0.67
rock: 0.375
classic 0.275
pop 0.125
...

For simplicity the following function is used:

$$w_l(t) = (1 + \frac{1}{2}\log(\frac{f_{l,t}}{f_l + 1} + t)) * t * (\frac{f_{l,t}}{f_{l,t} + \sqrt{f_l}/avg(\sqrt{f_l})})$$

Fig. 3c

Theoretic approach:

```
for each Article in Database {
  compute modified OKAPI weight
  with User Profile.
}
```

Concrete example:

...
Article i: classic music.. => 0.945
...
Article j: rock music.. => 1.045
...
Article k: british music.. => 0.67
...

For reasons of simplicity, the function $$OKA_{modified}(q,i) = \sum_{t \in q \cap i} w(t) * 1 * 1$$

Is used, where q is the profile and i the article of the data base.

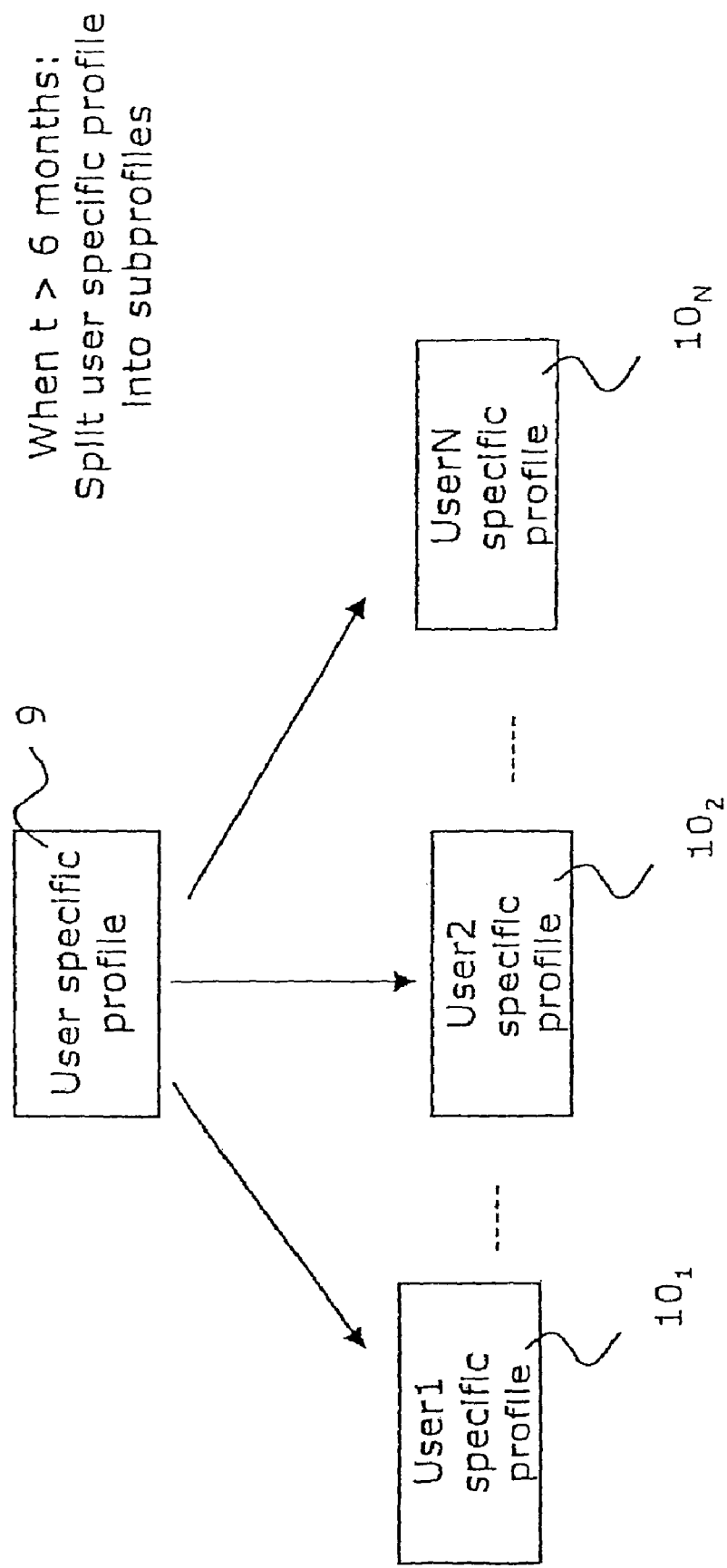

_US 7,970,762 B2_

METHODS TO CREATE A USER PROFILE AND TO SPECIFY A SUGGESTION FOR A NEXT SELECTION OF A USER

CROSS-REFERENCE TO RELATED APPLICATIONS

This application is a continuation of and is based upon and claims the benefit of priority for U.S. application Ser. No. 10/525,665 filed Nov. 21, 2005, which is herein incorporated by reference. U.S. Ser. No. 10/525,665 is a National Stage application of PCT/EP03/09473 filed Aug. 27, 2003, which claims the benefit of priority from European Patent application 02019492.4 filed Aug. 30, 2002.

BACKGROUND OF THE INVENTION

1. Field of the Invention

The present invention relates to methods to create a user profile and to specify a suggestion for a next selection of a user, in particular to a method to create a user profile that comprises a list of word-weight pairs, a method to create an individual user profile from a multi-user profile that comprises a list of word-weight pairs, and a method to specify a suggestion for a next selection of a user, which suggestion is determined on basis of suggestion results, which are computed of future program descriptions and a user profile.

2. Discussion of the Background

Several technologies are known which make an attempt to make "reasonable suggestions" for all kinds of content selection applications to users of these applications. For such suggestion engines usually users and their preferences are modelled to present a most likely next content selection recommendation. One common way to model users and their preferences is to use predefined stereotypes of user groups that characterize the users interests concerning certain applications and/or topics. Also, the logging of user actions is widely used to infer certain characteristics therefrom. Such recommendation systems are often server-based and collect a lot of explicit ratings from a lot of users to build up profiles. Each user is then located in one of these learned profiles and under the assumption that the user will probably also like what the other users used to build up the profile liked, new suggestions of content selection probabilities will be made.

A model of a user and the corresponding preferences is usually a list of word-weight pairs, i.e. a list of weighted keywords, according to which new possible selections are searched to find the best matching one. The paper "Adaptivity through Unobstrusive Learning" by Ingo Schwab and Alfred Kopsa, Künstliche Intelligenz, Volume 3-02, pages 5-9, ISSN 0933-1875, Arendt Tapp Verlag, Bremen describes an approach for learning user profiles which consists of such a list of weighted keywords implicitly from positive user observations only. In this paper several methods together with user profiles are described. Further, in the paper "similarity measures for short queries" by Ross Wilkinson, Justin Zobel, Ron Sacks-Davis, Department of Computer Science, RMIT, GPO Box 2476V, Melbourne 3001, Australia, October 1995, Fourth Text Retrieval Conference (1995), 277-285, information retrieval techniques are described to find articles and databases based on certain keywords, in particular for ad-hoc queries which are usually short, of perhaps two to ten terms.

As mentioned above, the known systems compute suggestions based on an existing user profile and/or a users history, and it might be possible that the user profile can be edited directly by the user or it is computed automatically. As also mentioned above, another often used mechanism is to cluster groups of users according to their behaviour and/or selections, wherein an explicit rating about the contents from these users is necessary. It is then assumed that what the users in the group like will most likely also be a good suggestion for the current user. However, all these methods have in common that they make rather general suggestions, resulting from the overall history of the user or the group he belongs to. In the paper "Program driven music radio", by Conor Hayes, Padraig Cunningham, Patrick Clerkin, Marco Grimaldi, Department of Computer Science, Trinity College Dublin, Proceedings of the ECAI 2002 ($5^{th}$ conference on artificial intelligence on 21. to 26. Jul. 2002), it is described to find better recommendations that are pertinent to a listener's current listening preference in streaming audio technology and recommendation techniques, according to which the resulting suggestions are filtered according to the current situation. The current situation here is the users behaviour in a certain (recent) time window to assure adaptation of the suggestions to an eventually changed taste of the user. However, also in this system the suggestion might be rather general to fit the current situation.

Such rather general suggestions that are valid for the user/user group as observed over a certain period of time might be inappropriate in certain situations.

BRIEF SUMMARY OF THE INVENTION

Therefore, it is the object underlying the present invention to provide improved techniques to generate user profiles and to specify a suggestion for a next selection of a user.

This object of the present invention is solved by a method to create a user profile that comprises a list of word-weight pairs according to independent claim 1, a method to create an individual user profile from a multi-user profile that comprises a list of word-weight pairs according to independent claim 29, and a method to specify a suggestion for a next selection of a user, which suggestion is determined on basis of suggestion results which are computed of future program descriptions and their user profiles according to independent claim 33. Preferred embodiments thereof are defined in the following subclaims. Further, the present invention provides a computer program product according to claim 38, a computer-readable storage medium according to claim 39, a profiler to create a user profile that comprises a list of word-weight pairs according to claim 40, and a suggestion engine to specify a suggestion for a next selection of a user, which suggestion is determined on basis of suggestions results which are computed of future program descriptions and a user profile according to claim 41. A preferred embodiment of the suggestion engine is defined in claim 42.

It should be noted that instead of word-weight pairs, i.e. a list of weighted keywords as already explained above also more general structures such as n-grams (words depending on the context of the n previous words (excluding stopwords) can be used. Also phrases containing more than one word are possible. These structures are called "key structures".

Also a forgetting factor can be used that weights "old" keywords (that result from user selection in the past) which are dynamically weighted lower (depending on how long ago they show the word occurred in was chosen). In this way the most recent selections get a higher weight and thus an adaptation to changes in the user's interest becomes possible. Further, the term "future program" should be understood as "future program or stored personal content". Moreover, the term "program description" is meant to comprise also a "description of the selection, e.g. TV program abstract".

The method to create a user profile that comprises a list of word-weight pairs according to the present invention comprises the step of computing the weights based on user features that represent a typical general behaviour of an individual user in respect to the application where the user profile is used.

The method to create an individual user profile from a multi-user profile that comprises a list of word-weight pairs according to the present invention comprises the step of at least once splitting the multi-user profile according to user features that represent a typical general behaviour of an individual user in respect to the application where the user profile is used.

The method to specify a suggestion for a next selection of a user, which suggestion is determined on basis of suggestion results which are computed of future program descriptions and the user profile according to the present invention comprises the step of filtering a user history which is used to create the user profile, and/or a suggestion results based on an actual situation of the user represented on basis of user features that represent a typical general behaviour of an individual user in respect to the application where the user profile is used.

Therewith, according to the present invention the user profile as well as the suggestions computed based thereon are obtained taking a special set of user features into account. The user features are defined to represent a typical general behaviour of an individual user in respect to the application where the user profile is used. In other words, for each application where a user profile is used a special set of user features are defined which are able to represent a typical general behaviour of an individual user. Based on these user features the weights in the list of word-weight pairs or weighted keywords are computed or influenced during the creation of the user profile, a multi-user profile is split during the creation of an individual user profile from a multi-user profile, or during specification of a suggestion a user history which is used to create the user profile, and/or the user profile, and/or the suggestion results are filtered.

The user features are chosen to be able to represent a typical general behaviour of an individual user in respect to the particular application, i.e. to be able to characterize predetermined schemes or rules according to which the user usually makes his selections. By initially considering the selection history like in prior art systems it is possible that the methods according to the present invention more and more adapt to the behaviour of an individual user, but not mainly based on finding characteristics in the selections of the user, but rather by improving a simulation of the user's interest.

Depending on the application, different features might be helpful/necessary to infer from users action what he actually likes. These features are different from recent "state-of-the-art". By choosing these particular features a more complex reasoning can be conducted that helps to compute user preferences on a deeper level.

Furthermore, the features in the history are used to compute dynamically a specific profile based on an actual user request. Assume for example the user watches different movies on working days (maybe shorter ones and not too exciting) as on weekends. Furthermore, on weekends his watching behaviour in the afternoon is different from the night. So if on a certain Saturday night the user requests a movie all relevant entries are selected from the history and out of these a very specific profile as the basis for the current suggestion is computed.

Alternatively, the profile computed from the general history can be used to make an initial suggestion of a number of items (e.g. TV shows). Then this can be further filtered based on the features in the history.

The method to create a user profile according to the present invention preferably comprises the step of evaluating an influence of the user features from a user history.

Alternatively or additionally, the method to create a user profile according to the present invention preferably comprises the step of dividing the user profile into sub user profiles according to characteristics of stereotype user profiles to obtain more specialized profiles.

Further alternatively or additionally, the method to create a user profile according to the present invention preferably comprises the step of determining words to be included in the list of word-weight pairs on basis of words included in program descriptions of previous selections by the user.

In this case, the method to create a user profile according to the present invention preferably comprises the step of determining further words to be included in the list of word-weight pairs on basis of a database evaluation of occurrences of words already included in the list.

Alternatively or additionally in this case, the method to create a user profile according to the present invention preferably comprises the step of computing a weight of a word to be included in the list of word-weight pairs on basis of a comparison of an inverse document frequency of said word with respect to all available program descriptions and an inverse document frequency of said word with respect to program descriptions of previous selections by the user.

Further alternatively or additionally in this case, the method to create a user profile according to the present invention preferably comprises the step of computing weights of words to be included in the list of word-weight pairs as a product of
    importance of the word with respect to all program descriptions of previous selections by the user,
and at least one of the following terms:
    a constant term, in particular one,
    importance of the word with respect to the program description in which the word is included,
    importance of the word with respect to all available program descriptions, and
    a correctional factor that depends on the length of the program description in which the word is included and the frequency of the word in this program description.

In the method to create a user profile according to the present invention, the importance of a word with respect to all program descriptions of previous selections by the user is preferably determined on basis of the portion of the word in the set of all words of the program descriptions of previous selections by the user.

In the method to create a user profile according to the present invention, the importance of a word with respect to all program descriptions of previous selections by the user is further preferably determined under consideration of the program description in which the word is included.

In the method to create a user profile according to the present invention, the importance of the word with respect to the program description in which the word is included is preferably determined on basis of occurrences of the word in said program description with respect to occurrences of the word in a wider database.

In the method to create a user profile according to the present invention, the importance of the word with respect to all available program descriptions is preferably determined on basis of its inverse document frequency in respect to all available program descriptions.

In the method to create a user profile according to the present invention, the importance of a word with respect to all available program descriptions is further preferably determined under consideration of the program description in which the word is included.

In the method to create a user profile according to the present invention, the step of computing weights of words to be included in the list of word-weight pairs might be performed according to the following formula:

$$w_i(t) = \left(1 + \frac{1}{2}\log\left(\frac{f_{i,t}}{f_i + 1} + 1\right)\right) \cdot a \cdot \log\left(\frac{N - f_t}{f_t}\right) \cdot \left(\frac{f_{i,t}}{f_{i,t} + \sqrt{f_i}/\text{avg}(\sqrt{f_i})}\right),$$

wherein $w_i(t)$ is the weight of a word t in a program description i, a is the importance of the word t in the all program descriptions of previous selections by the user, t is the word, $f_{i,t}$ is the number of occurrences of the word t in the program description i, $f_i$ is the document length of the program description i, $f_t$ is the number of program descriptions containing the word t, and N is the number of program descriptions in the database.

In the method to create a user profile according to the present invention, the step of computing weights preferably comprises a step of normalizing a computed weight of a word included in the list of word-weight pairs by a behaviour of the user to stay with a selection and to switch selections off, i.e. a zapping behaviour. Also, to turn on just for this selection and to switch off exactly at the end plays an important role.

In the method to create a user profile according to the present invention, the step of computing weights alternatively or additionally preferably comprises a step of normalizing a weight of a word included in the list of word-weight pairs by a behaviour of the user when to actually consume a recorded selection.

In the method to create a user profile according to the present invention, the step of computing weights further alternatively or additionally preferably comprises a step of averaging the weights of a word over all program descriptions of previous selections by the user in which the word occurs. These are the weights w (t) computed as the average out of the weights $w_i(t)$.

In the method to create a user profile according to the present invention, the step of computing weights still further alternatively or additionally preferably comprises a step of excluding words from the list of word-weight pairs which show a weight below a predetermined threshold or within a predetermined lower range of weights.

In the method to create a user profile according to the present invention, the step of computing weights still further alternatively or additionally preferably comprises a step of computing a weight of a word to be included in the list of word-weight pairs by considering negative selections of the user.

In the method to create a user profile according to the present invention, the step of computing weights still further alternatively or additionally preferably comprises a step of computing a weight of a word to be included in the list of word-weight pairs by considering a maximum frequency of possible user selections in respect to certain user features.

In the method to create a user profile according to the present invention, the created user profile is preferably used as a query in possible future program descriptions to suggest at least one possible future selection to the user.

In this case, in the method to create a user profile according to the present invention preferably for each possible future program description a modified OKAPI weight is computed, wherein each matching word has its weight as a cofactor so that the search result is influenced according to the user profile.

In this case, in the method to create a user profile according to the present invention further preferably said modified OKAPI weight is computed according to the following formula:

$$OKA_{modified}(q, i) = \sum_{i \in q \wedge t \in i} w(t) \cdot \log\left(\frac{N - f_t}{f_t}\right) \cdot \left(\frac{f_{i,t}}{f_{i,t} + \sqrt{f_i}/\text{avg}(\sqrt{f_i})}\right),$$

wherein w(t) is the weight of a word t over all program descriptions of previous selections by the user, q is a query built according to the user profile, i are all program descriptions of possible future selections, w(t) is the weight of the word t, namely the average of $w_i(t)$, $f_{i,t}$ is the number of occurrences of the word t in the program description i, $f_i$ is the document length of the program description i, $f_t$ is the number of program descriptions containing the word t, and N is the number of program descriptions in the database.

In this case, in the method to create a user profile according to the present invention alternatively further preferably said modified OKAPI weight is computed according to the following formula:

$$OKA_{modified}(q, i) = \sum_{t \in q \wedge t \in i} w(t) \cdot \left(1 + \frac{1}{2}\log \cdot \left(\frac{f_{i,t}}{f_i + 1} + 1\right)\right),$$

wherein w(t) is the weight of a word t over all program descriptions of previous selections by the user, q is a query built according to the user profile, i are all program descriptions of possible future selections, w(t) is the weight of the word t, $f_{i,t}$ is the number of occurrences of the word t in the program description i, and $f_i$ is the document length of the program description i.

In this case, in the method to create a user profile according to the present invention alternatively or additionally further preferably the query is built by combining a stereotype user profile and the created user profile, wherein initially, when providing the suggestion for the first time, the stereotype user profile is user alone, within a first predetermined period during the collection of data for computing the created user profile a linear combination of both user profiles is used, and after said first predetermined period during the collection of data for computing the created user profile the created user profile is used.

In the method to create a user profile according to the present invention the stereotype user profile might comprise a generic stereotype profile, which describes an average interest in everything, and at least one specific stereotype profile each defining interests of a user who focuses on a specific topic.

In the method to create a user profile according to the present invention preferably a weight with which a specific stereotype user profile is considered during the linear combination to provide said suggestion is computed by matching the user selections with the data in the respective specific stereotype and increasing the weight of the stereotype if a match is found.

Also, initially several stereotype profiles for different user groups are used. After a few observation of the behaviour or a particular user a more specific stereotype is computed as linear combinations of the initial stereotypes.

In the method to create a user profile according to the present invention preferably after a second predetermined period the query is built by an individual user profile created as defined and described below.

In the method to create a user profile according to the present invention preferably the query is built under consideration of a filtered user profile as defined and described below.

In the method to create an individual user profile from a multi-user profile according to the present invention preferably for splitting the multi-user profile the following steps are performed:

a) performing a tentative split according to user features to generate a first and a second sub user profiles,
b) calculating the relative difference between the two sub user profiles,
c) performing steps a) and b) until all or a predetermined number of tentative splits are performed, and
d) splitting the multi-user profile according to that tentative split that yields the highest relative difference in case said relative difference lies above a predetermined threshold.

In the method to create an individual user profile from a multi-user profile according to the present invention during said splitting preferably said relative difference is calculated by calculating a difference of a first discrete probability distribution of the first sub user profile over the user features that are contained therein and of a second discrete probability distribution of the second sub user profile over the user features that are contained therein.

In the method to create an individual user profile from a multi-user profile according to the present invention during said splitting further preferably said difference of said two discrete probability distributions is calculated using the symmetrized Kullback-Leibler-distance sum, where events which happen zero times are replaced by one virtual occurrence.

Each of the above described methods according to the present invention is preferably used in an audio/video program suggestion engine.

In each of the above described methods according to the present invention further preferably said audio/video program suggestion engine is internet based.

Each of the above described methods according to the present invention is preferably client based, i.e. it is implemented on a consumer device like TV, set-top-box, VCR, home server, rather than on an Internet server or similar public server.

In each of the above described methods according to the present invention further preferably said user features comprise one or more of the following features:

preferred channel of audio/video program consumed by the user,
typical time to consume an audio/video program by the user,
length of consuming an audio/video program by the user in relation to the total length of the audio/video program,
time of beginning the consume of an audio/video program by the user in relation to a start time of the audio/video program,
typical length of consuming an audio video program by the user in relation to the time of consuming,
relation between how often a particular audio/video program is consumable and how often it is consumed by the user,
general audio/video program consuming behaviour of the user, in particular in relation to a switch-on time and length of a used audio/video device,
audio/video programs recorded by the user,
time duration between the recording of a particular audio/video program by the user and the consuming of said audio/video program by the user,
actual mood of the user,
actual wish of audio/video program entered by the user,
year of production of an audio/video program consumed by the user,
director and/or actor and/or group of actors of an audio/video program consumed by the user,
type of an audio/video program consumed by the user, and
title of an audio video program consumed by the user.

The computer program product according to the present invention comprises computer program means adapted to perform the method steps as described and defined above when being executed on a computer, digital signal processor, or the like.

The computer readable storage medium according to the present invention stores thereon a computer program product as described and defined above.

The profiler to create a user profile that comprises a list of word-weight pairs according to the present invention is adapted to perform the method steps as described and defined above.

The suggestion engine to specify a suggestion for a next selection of a user, which suggestion is determined on basis of suggestion results which are computed of future program descriptions and a user profile according to the present invention is adapted to perform the method steps to specify a suggestion for a next selection of a user as described and defined above.

The suggestion engine according to the present invention preferably comprises a profiler according to the present invention.

BRIEF SUMMARY OF THE SEVERAL VIEWS OF THE DRAWINGS

In the following the present invention will be described by way of an exemplary embodiment thereof taken in conjunction with the accompanying figures, wherein FIGS. 4a and 4b show the adapting and splitting of user profiles according to a second aspect of the present invention.

DETAILED DESCRIPTION OF THE INVENTION

In the following, the present invention is exemplary described in a context of a system that gives recommendations for TV programs for a set of users in a home environment. The present invention is in particular applicable to such a system, since today's users of TV programs are faced with a vast variety of channels and shows, between which they have to chose what they want to watch or record. Electronic program guides (EPGs) that are available on the internet, on information streams accompanying TV broadcast such as Teletext or generally in DVB and on set top boxes help and assist the user in making a decision which show to watch, however, the number of channels and shows remains too large. Therefore, an engine that makes explicit suggestions to the user that fit his tastes and habits according to the present invention is particular suited to determine suggestions tailored to the particular user in the particular situation. Of course, the present invention which is in fact particularly applicable to such a TV program recommendation system is not limited thereto, but might also be used for recommending other audio/video picture, i.e. multimedia, contents or might help to find holiday targets, hotels, travelling routes, books, etc., i.e. might assist a user in any situation where a decision has to be made.

Figure 1:
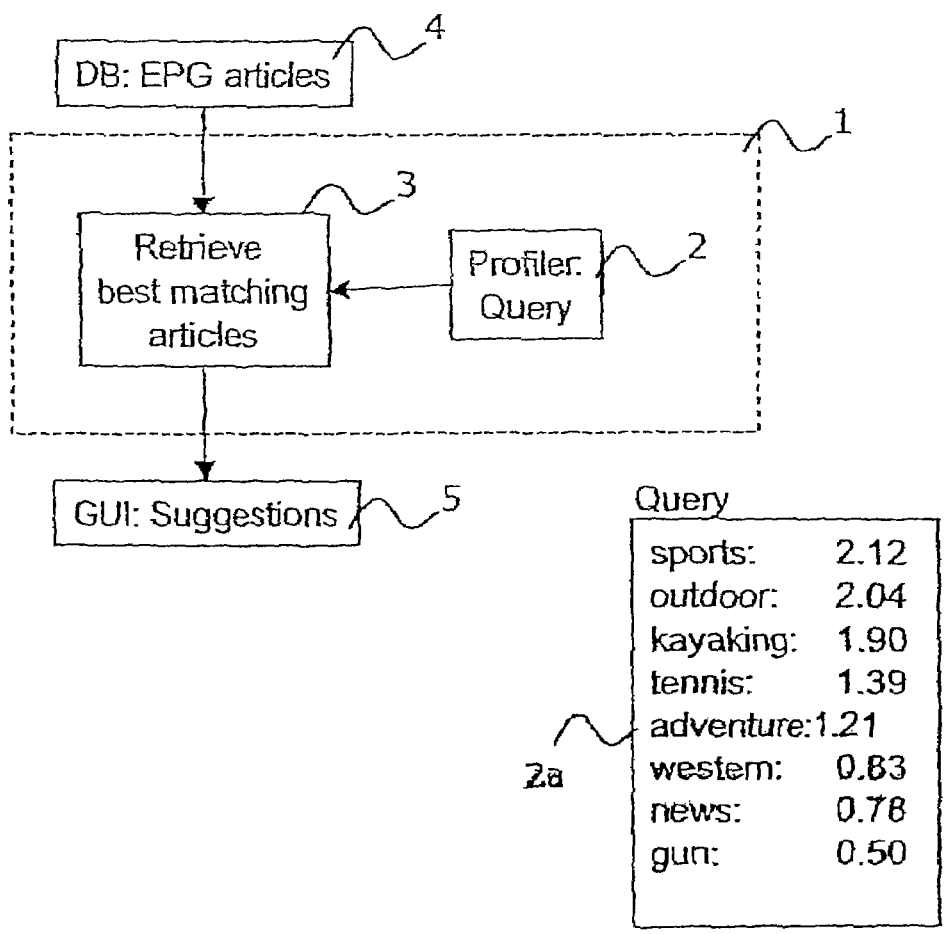
FIG. 1 shows the arrangement of a suggestion engine for a home server user interface.

FIG. 1 shows the arrangement of a suggestion engine 1 within a home server user interface, wherein the suggestion engine 1 is used to provide suggested electronic program guide articles, which are retrieved from an electronic program guide articles database 4. The suggestion engine 1 comprises a retrieval unit 3, which is connected to the electronic program guide articles database 4 and which provides the suggested electronic program guides article(s) on a multimodal user interface 5 including graphics, speech, haptics, touch sense, and an animatel life-like character and any subset out of these. The suggestion engine 1 comprises additionally a profiler 2, which is connected to the retrieval unit 3. The profiler 2 builds a user profile and supplies this as a query to the retrieval unit 3, which retrieves the articles from the EPG articles database 4 that are best matching to the query. These best matching articles are then supplied as suggested EPG articles to the user via a graphical user interface (GUI) 5.

FIG. 1 also shows an exemplary EPG article 4a of the EPG articles database 4 which is referring to a television show broadcasted on the date Jul. 18, 2002 with a start time of 22:00 h and an end time of 22:45 h on the station "channel 5" with the title "extreme sports". Further, the EPG article 4a supplies the description "The Italian volcanic island of Vulcano provides the gruelling backdrop for some tough sports, including hill-running, kayaking and mountain-biking" for said television show. Also, FIG. 1 shows an exemplary query 2a generated as user profile by the profiler 2. The query is a set of weighted words, i.e. word-weight pairs and includes sports: 2.12, outdoor: 2.04, kayaking: 1.90, tennis: 1.39, adventure: 1.21, western: 0.83, news: 0.78, and gun 0.50. A query might comprise further word-weight pairs, which are not shown.

Figure 2:
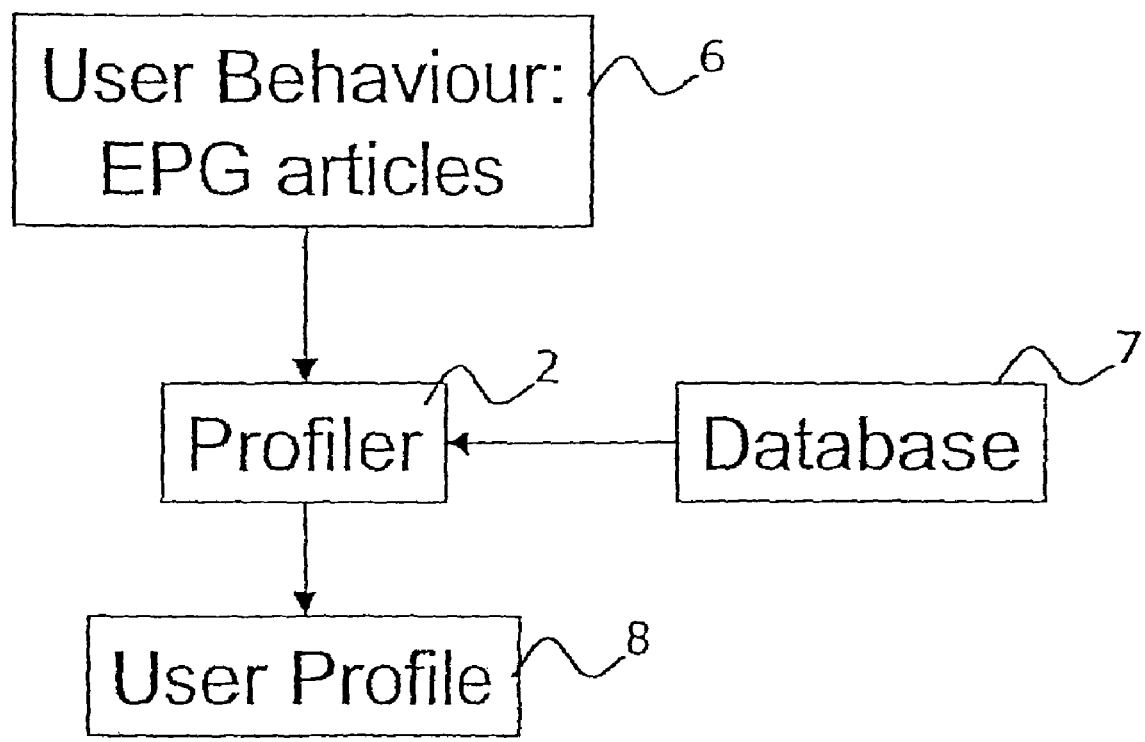
FIG. 2 shows the arrangement of a profiler shown in FIG. 1, FIG. 3a to 3c show a user profile generation according to a first aspect of the present invention and its application to make a suggestion.

FIG. 2 shows the structure used to build such user profiles or queries as a list of word-weight pairs. The profiler 2 has access to a user behaviour database 6 which comprises EPG articles of the programs the user has watched and to a database 7 to retrieve additional information, as e.g. described further below. On basis of these two information sources the profiler 2 generates a user profile 8, which produces queries that e.g. might look like the query 2a shown in FIG. 1.

The improved way of calculating the weights for the keywords and the suggestions resulting therefrom, what also improves the suggestions, according to the present invention is described in connections with FIGS. 3a to 3c. For this calculation a special set of user features are taken into account that are also used to compute the suggestions according to the present invention. In the described exemplary embodiment it is the aim of the invention to be able to make a specific suggestion to a user who wants to watch TV. The mechanism is the determination of relevant keywords from EPG articles, i.e. program descriptions, here respective descriptions of the relevant data and abstracts of TV shows, a weighting scheme for the determined relevant keywords, and a search, which identifies relevant EPG articles of future TV shows as suggestions.

In this embodiment the user features that represent a typical general behaviour of an individual user might be:
preferred channel,
typical time (day of week, time of day, weekend, bank holiday, . . . ) to watch TV,
zapping behaviour, e.g. if a show was watched for a very short time only that probably means that the user did not like it, whereas when the user explicitly switches to a channel at the beginning of a show and watches it for the whole time and then switches off or switches to another channel, the user probably likes the show; A weight z(i) can reflect how much the user likes a specific show or program with respect to the zapping behaviour,
length of the show, e.g. it could make a difference when a movie takes two hours, whether the user wants to watch it in the early or late evening,
relation between how often a series is broadcasted and how often it is watched,
time the TV is switched on, i.e. whether it is just running all day or it is specifically used for particular TV shows; in the first case the selected program might have a lower weight,
what was recorded,
how long did it take until something that was recorded was watched,
how often was a recorded program watched, e.g. was it watched at all; a corresponding weight r(i) might reflect how much the user likes a specific show with respect to these questions,
also the mood of the user can be taken into account,
year of movie production,
director, actor, pair or group of actors,
title,
type,
an actual wish of a program entered by the user.

The typical behaviour, e.g. zapping to a few specific channels, of the user after switching on the TV can be learned from the past and an immediate suggestion after switching on the TV can be made. Since the user features that represent a typical general behaviour of the user are influenced from the history and not only specific articles of the history are used to generate the suggestions, it is according to the present invention possible that something new will be suggested.

Further explicitly surprise suggestions can be made that do not fit the profile on purpose. These surprises are either chosen randomly or near matches of the user or profile or deliberately contrary to the user profile or they are obtained from an Internet server based on stereotype user profiles or they are included directly in the EPG.

In this context the clustering within a profile is also possible, i.e. instead of keeping specific keywords to build a profile, a profile could also be composed of weighted, very specific profiles, e.g. a profile for classical music, one for extreme sports, etc. In this way it can be ensured that the suggestion engine can generalize data, using the information in the specific profiles. E.g. if a user likes to listen to Beethoven, he/she might also like Mozart. This cannot be learned from the history if nothing with Mozart was ever selected, but in the specific profile of classical music, the correlation between Mozart and Beethoven could be modelled so that in suggestions according to the present invention also Mozart in addition to Beethoven could occur. Such a modelling might be based on co-occurrence of words in either the EPG data or in other textual resources, e.g. news groups or other articles discussing music, movies or TV programs, can be used to extend the set of used keywords in the profiles. Also homonyms and thesaurus could be used. These and other possibilities to specifically look for the extension of keywords of a user profile might be included in the database 7 shown in FIG. 2 to which the profiler 2 has an access. A further example might be that supposed James Bond and Michelle Pfeiffer co-occur in such texts, if the user has watched James Bond a few times recently, then both James Bond and Michelle Pfeiffer should be added to his profile. Also, from an Internet server such co-occurrence lists can be downloaded in regular intervals. These can be computed based on behaviour of several larger user groups in context of the recent TV program.

According to the described preferred embodiment of the present invention the computation of the user profile using the above-mentioned features and the importance of the keywords contained in selected EPG items might be computed as follows:

The user history consists of the selected EPG articles, that means the EPG articles that correspond to the programs the user has watched, together with the user features as described above. FIG. 3a shows that in a first step S1 the history consisting of a set of articles is read. In the examples a first article comprises the keywords pop, music, rock, Madonna, music, a second article comprises the keywords Beethoven, symphony, Mozart, classic, a third article comprises the keywords: punk, rock, music and a fourth article comprises the keywords: classic, philharmonic, music.

As described further below, based on a specific user request, e.g. "movie on the weekend", the user history can first be filtered such that only EPG articles remain that fulfil this request. If a user request is e.g. "movie on the weekend", it is first determined if there is a significant difference in the watching behaviour between the weekend and working days, before a filtering takes place. A significant difference can be determined with respect to e.g. length, type of the movie, e.g. action thriller versus love story, channel or other user features. Of course, as also further elucidated below, the full user history might be determined and a filtering according to a specific user request might be performed in a later stage. Further alternatively, not the whole history, but only the history corresponding to filtered articles might be used to determine the user history.

In a following step S2 (does not appear in FIG. 3a-c) for each word, also referred to as term, that is present in at least one of the articles contained in either the full or the filtered user history, a weight is computed with respect to each article. This weight according to the present invention reflects the particular interest or lack of interest of the word for the user. The weight might reflect the relation of the user profile to the "normal" frequency of occurrence. The words for which the weights are computed might be all words that are present in the articles or a reduced set of words, e.g. obtained by filtering with a stop word list to e.g. not include articles or other unimportant words.

The weight of a word with respect to an article is preferably the product of the importance of the word with respect to this article times the importance of the word with respect to all selected articles, i.e. the history, times the importance of the word with respect to the complete database times a correctional factor that depends on the length of the article and the frequency of the word. An example is:

$$w_i(t) = \text{importance}(i, t) * \text{importance}(S, t) * \text{importance}(D, t) * \text{corr}(i, t),$$

where t is the word, i the article, S the selection, i.e. all articles of the user history, and D the database. The mentioned importance functions for a word/article, word/selection, word/database are usually different. For example, the importance of a word relative to an article can be the number of its occurrences in the article, the importance of a word relative to the selection, i.e. the history, can be the portion of the word in the set of all words in the selection, and the importance of a word relative to the database can be its inverse document frequency. As mentioned, these three functions are only examples. Different functions might be chosen.

The function's importance (S, t) and importance (D, t) might also depend on the article, i.e. i. For importance (S, t) it is also possible that only a constant factor is chosen. Apart from the importance in respect to the selection, all other factors are preferred, but optional, in other words, the usage of importance (i, t), importance (D, t), and corr (i, t) for the computation of the weight w(i, t) at all is optional. The importance with respect to the complete database which is also dependent on the article, i.e. importance (D, i, t), often yields either 0, if the word t occurs in most documents of the database and therefore is not very specific, or yields 1, if the word is very specific only for certain articles. A continuum of values between 0 and 1 is possible, reflecting if the word t is more or less specific. A concrete example for the above function is:

$$w_i(t) = \left(1 + \frac{1}{2}\log\left(\frac{f_{i,t}}{f_i+1}+1\right)\right) \cdot a \cdot \log\left(\frac{N-f_t}{f_t}\right) \cdot \left(\frac{f_{i,t}}{f_{i,t}+\sqrt{f_i}/\text{avg}(\sqrt{f_i})}\right),$$

where a is the importance of the term t in this selection, t is the term, i.e. the word, $f_{i,t}$ is the number of occurrences of the word t in the article i, $f_i$ is the document length of the article i, $f_t$ is the number of articles containing the word t, and N is the number of articles in the database.

The weight w(i, t) might be normalized by the weights r(i) and z(i), i.e. by the weight which reflects how much the user likes a specific show with respect to the questions whether a recorded show was watched at all, how often was it watched, and how long did it take until something that was recorded was watched, and the weight which reflects how much the user likes a specific show or program with respect to the zapping behaviour.

If a word t does not occur in a specific article i, the weight $w_i(t)=0$.

In FIG. 3a the weights for the words music, classic, rock, and pop in the first to fourth articles are exemplary calculated in that the word music has a weight 1.2*1*1*0.9=1.08 in the first article, 0 in the second article, 1*1*1*0.8=0.8 in the third article, and 1*1*1*0.8=0.8 in the fourth article, the word classic has a weight 0 in the first article, 1*1*1*0.4=0.4 in the second article, 0 in the third article, and 1*1*1*0.7=0.7 in the fourth article, the word rock has a weight 1*1*1*0.7=0.7 in the first article, 0 in the second article, 1*1*1*0.8=0.8 in the third article, and 0 in the fourth article, and the word pop has a weight 1*1*1*0.5=0.5 in the first article, 0 in the second article, 0 in the third article, and 0 in the fourth article.

In a following third step S3 the weights $w_i(t)$ of a single word t in respect to one article is averaged over all articles i of the selection to obtain the final weight w(t) for this word. In the example shown in FIG. 3a for the word music the final weight (1.08+0.0+0.8+0.8)/4=0.67 is obtained, i.e. w(music)=0.67, for the word classic the final weight (0.0+0.4+0.0+0.7)/4=0.275 is obtained, i.e. w(classic)=0.275, for the word rock the final weight w(t) is calculated to (0.7+0.0+0.8+0.0)/4=0.375=w(rock), and for the word pop the final weight is calculated to (0.5+0.0+0.0+0.0)/4=0.125=w(pop).

Words that might be added to the user profile based on the above-referenced co-occurrence in databases, e.g. text databases, might receive a heuristic weight. For example, if the user has watched James Bond movies and this keyword co-occurs frequently with Michelle Pfeiffer, then w(Michelle Pfeiffer) will be a certain fraction of w(Sean Connery), if Michelle Pfeiffer never/rarely occurs without Sean Connery.

In a following fourth step S4, which is shown in FIG. 3b, the user profile is determined as the set of all terms of the history with the corresponding weights so that the user profile then consists of a set of word-weight pairs. It can contain all words and their weights or only a subset of the words with the highest weights might be taken in order to keep the computational overhead small.

In FIG. 3b the user profile shows the entries: music: 0.67, rock: 0.375, classic: 0.275, and pop: 0.125 as calculated in step S3.

For simplicity the following function $w_i(t)$ that determines the weight of a word t in an article i was used for the determination of the user history in the concrete example shown in FIGS. 3a and 3b:

$$w_i(t) = \left(1 + \frac{1}{2}\log\left(\frac{f_{i,t}}{f_i+1}+1\right)\right) \cdot 1 \cdot 1 \cdot \left(\frac{f_{i,t}}{f_{i,t} + \sqrt{f_i}/\text{avg}(\sqrt{f_i})}\right).$$

The user profile as generated according to the above description is then considered as a query q which is used for the search in the database for EPG articles corresponding to possible future selections of the user, i.e. to the possible suggestions made according to the present invention. Generally, any available information retrieval algorithm might be used as long as the weight of the words in the user profile can be considered as a co-factor to influence the search result. In the following, an exemplary embodiment of a modified OKAPI weight is described, which OKAPI weight is computed for each EPG article relevant to fulfil the user's request, e.g. "movie on the weekend". During the weight computation each matching word has its weight as a co-factor so that the search result is influenced according to the information of the user profile, that is the preferences of the user, so that:

$$OKA_{modified}(q, i) = \sum_{t \in q \wedge t \in i} w(t) \cdot \log\left(\frac{N-f_t}{f_t}\right) \cdot \left(\frac{f_{i,t}}{f_{i,t} + \sqrt{f_i}/\text{avg}(\sqrt{f_i})}\right)$$

where the articles i are now from a complete future database of EPG articles and in addition all recorded TV shows. The modification of the formula to determine the OKAPI weight (as it is e.g. described in the above paper of Wilkinson et al.) lies in the insertion of the weight w(t), which is the average of all $w_i(t)$, according to the present invention. With this formula those EPG articles get a high weight that contain words of the user profile that have a high weight, i.e. that have a high importance.

Another possibility to formulate a modified OKAPI weight among other possible solutions could be:

$$OKA_{modified}(q, i) = \sum_{t \in q \wedge t \in i} w(t) \cdot \left(1 + \frac{1}{2}\log\cdot\left(\frac{f_{i,t}}{f_i+1}+1\right)\right)$$

Therefore, in a following step S5, which is shown in FIG. 3c, for each article in the database corresponding to current, future or recorded programs, i.e. programs that will be available to the user, in particular in a range of time specified by the user, e.g. as a pre-setting: "now", or "on the weekend", the modified OKAPI weight with the user profile is computed. Exemplary, an i. article comprising the words: "classic music" would yield in an modified OKAPI weight 0.945, a j. article which comprises the words "rock music" would yield a modified OKAPI weight 1.045, and a k. article which comprises the words "british music" would yield the modified OKAPI weight 0.67. For reasons of simplicity the following formula:

$$OKA_{modified}(q, i) = \sum_{t \in q \wedge t \in i} w(t) \cdot 1 \cdot 1$$

was used to compute these values, where q is the profile and i the article of the database.

Alternatively or in addition, the following scheme for the determination of relevant keywords and their weighting can be applied which determines relevant and irrelevant keywords. This determination is based on the known determination of the importance of a term (or keyword) using a (function of) inverse document frequency idf, wherein idf is defined as the number of documents in the whole database divided by the number of documents which contain the term in question. Usually the logarithm LOG ( ) of this value is taken and referred to as idf. If a term has a high idf, this basically means that it is infrequent in the document collection and probably very indicative in its meaning for the few documents that contain it.

According to the present invention the collection of the EPG data of the shows that the user has watched so far can be seen as a separate document collection and idf statistics might be computed for all terms contained in this user database. Then, the two idf statistics, i.e. the one computed according to the known technique and the one based on the EPG data of the shows that the user has watched so far, are compared to each other. If a word has a similar relevance in both document collections, this indicates that this word does not discriminate very well between the "average" TV watcher, as characterized by the entire EPG database, and the specific user, and therefore should not be given too much weight. As an example, the user happens to watch, say, news just as often as the average user does, and this is not particularly relevant for the user profile. Therefore, such terms are given a lower weight, although they might be rare and would otherwise be given a high weight. On the other hand, if a word occurs with a lower idf weight, i.e. a higher document frequency, in the user specific database as compared to the global EPG database, it can be concluded that the user is definitely deviating from the average user with respect to this very keyword, and would probably like to watch more programs corresponding to this keyword in the future. Therefore, the word weight will be increased in such cases. If a given word is selected significantly fewer times than expected by the user, an "anti-keyword" property can be assigned, i.e. corresponding to programs that the user wants to see less frequent than the average, which therefore should be avoided in recommendations. The so-determined word weight can and should be used together with the standard idf weight as computed from the main database. By the combination, the highest weight is given to words that are infrequent in the main database but frequent in the user EPG data.

As already stated above, descriptions from DVD, databases, internet, etc. can be used to enhance the information in the user history. Also, negative examples can be used to build up a negative profile that means shows or programs containing a special set of words that should not be selected. Furthermore, a function could be provided that enables the user to indicate "don't suggest this show again". It might be annoying to get a suggestion for a show that matches the user's profile, but that is actually disliked for some other reasons. Also, the EPG articles itself can be examined whether they contain some negation words like "not" in front of keywords.

It is also possible to consider whether the user watches specific TV shows, e.g. a series or movies by a certain director or with a certain (group of) actors, etc. regularly or (almost) ever, to be suggested regardless of the actual value of the OKAPI weight.

Further, to provide an even more user specific profile that will result in even more appropriate suggestions or this user, it is possible to split the user histories according to the following categories as it is described in more detail further below:

Maintain different histories for different members of the family. E.g. a child will most probably like a different type of TV show than the mother or father does. Computing a profile from all shows that were watched on one television, irrespective of who watched it, will result in very "diffuse" suggestions that are not appropriate for e.g. the father. Using different profiles can ensure to make appropriate suggestions depending on the person asking for suggestions. Who is actually watching TV could be determined by a login procedure, a simple selection from a user list, or in case this is not wanted by speaker identification techniques in case the device is equipped with a speech interface. Also a camera, a fingerprint sensor or some other biometric information could be used to identify the user.

Different histories and/or profiles could be maintained depending on the time of the day or the day of the week, or any other user feature according to the present invention. E.g. depending on the day or the time different kinds of shows might be watched. This should be captured in the profile so as to make appropriate suggestions when the user requests them for a particular time. In case there is none of the abovementioned possibilities to identify the user, this could alleviate the problem of identification by assuming the different members of the family have different "typical TV watching hours." It is to be noted that this might be an alternative application of the user history filtering mentioned above and further elucidated below.

If a user request concerned a TV show in the future, e.g. "movie tomorrow evening" then all movies shown from now until tomorrow evening should be considered and, if necessary, recorded.

Since according to the above-described aspect of the present invention the weights of the aspects in the user profile, keywords, time, specific profiles, give a notion of their relative importance, it is possible to create reasonable user profiles on the basis of only a few samples of the user history and also on the basis of a large user history. This enables the system to capture the user's long-term interests, temporary interests and gradually and abrupt changes of these interests.

In the following a second aspect of the present invention is described in connection with an example for the adaptation of a user profile for a TV program suggestion system in reference to FIGS. 4a and 4b. In the context of a system that gives recommendations, e.g. for TV programs, for a set of users, e.g. in a home environment, preferably an evolution of the user profiles is performed. This might be done, since the user habits are unknown when the system is first used and should evolve from the state of initial ignorance to a fine-grained user profile when much user reference data is available. Further, if there is no explicit way of identifying how many users use the recommendation system, the automatically generated user profile will be a mixture of the individual profiles of all the users. Therefore, according to the present invention, if sufficient data is available, a separating of the mixed profile into the underlying individual sub-profiles is performed.

In such a system usually the initial user profile, when using the system for the first time, is a generic "stereotype" profile, also just referred to as stereotype. A stereotype is the profile of a typical user and is usually conditioned on the primary interest of the user, e.g. sports, music, movie, etc. The generic stereotype, however, is a mixture of the more specific stereotype profiles and describes an average interest in everything, e.g. potentially with some emphasis on "blue chips" like Hitchcock movies, BBC, documentaries, Wimbledon Finals, etc. In addition to the generic stereotype there might be a set of specific stereotype profiles, also respectively just referred to as specific stereotype, describing interests of a user who focuses on sports or in culture or on Hollywood movies, etc. The final user profile might be a linear combination of the generic stereotype, the specific stereotypes and a user specific profile, i.e. user profile, which is usually empty at the beginning and then has an initial weight of zero in the linear combination.

When more user data comes in, this data is used to build up the user profile. However, a detailed user profile might need quite some usage data so that after only a few days or weeks of usage, there might be not yet be sufficient data available in many cases. Therefore, although the weight of the user profile is set to increase with increasing the amounts of data, most of the total weight of the linear combination of the profiles will come from the specific stereotype profiles, while the weight of the generic stereotype is set to decrease. The weights for each of the specific stereotypes are computed by matching the user data with the data in the respective stereotype and adding weight to the stereotype if a match is found. After much data is received, the weight of the generic stereotype will have reached nearly zero, the weight of the specific stereotypes will be low, and the weight of the user profile will be near to one. The user profile in this stage contains fine-grained information about the user's preferences, as expressed by his viewing behaviour. The user profile will be continued to be updated when more data comes in.

Figure 4A:
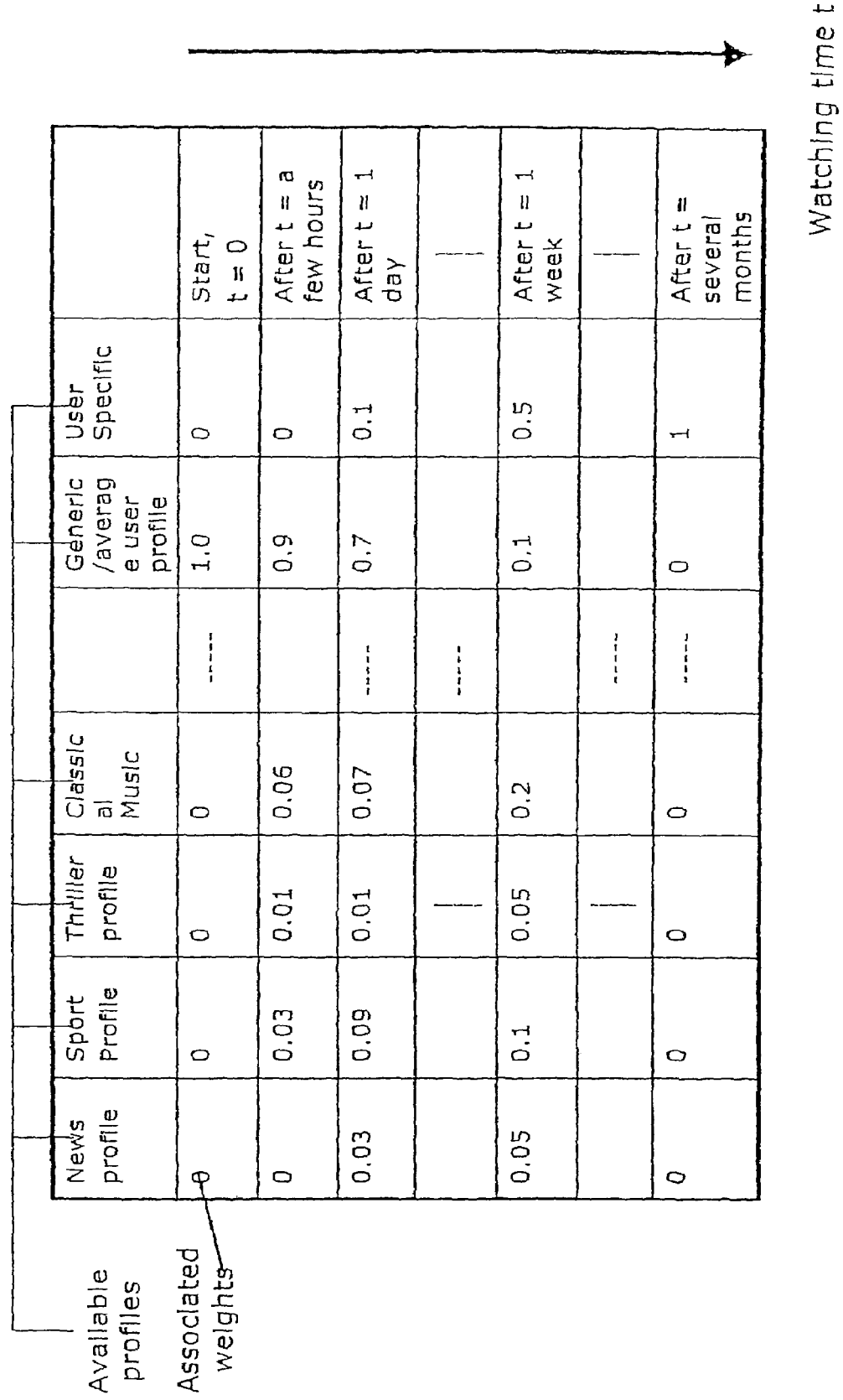

This smooth transition from the generic stereotype profile initially used for making suggestions to the user and the final user profile according to the present invention is shown in FIG. 4a which exemplary shows several profiles and their respective weights after certain times have passed. The available profiles are a news profile, a sport profile, a thriller profile, a classical music profile, a generic/average user profile, i.e. the generic stereotype, and a user specific profile, i.e. the user profile according to the present invention. The news profile has an initial associated weight 0, i.e. at a start time t=0, a first weight 0 after t=a few hours, a second weight 0.03 after t=1 day, which steadily increases to a third weight 0.05 after t=1 week, and which steadily decreases to a fourth weight 0 after t=several months. The sport profile has an initial weight 0 at a start time t=0, a first weight 0.03 after t=a few hours, a second weight 0.09 after t=1 day which steadily increases to a third weight 0.1 after t=1 week, and which steadily decreases to a fourth weight 0 after t=several months. The thriller profile has an initial weight 0 at the start time t=0, a first weight 0.01 after t=a few hours, a second weight 0.01 after t=1 day which steadily increases to a third weight 0.05 after t=1 week, and which steadily decreases to a fourth weight 0 after t=several months. The classical music profile has an initial weight 0 at a start time t=0, a first weight 0.06 after t=a few hours, a second weight 0.07 after t=1 day, which steadily increases to a third weight 0.2 after t=1 week, and which steadily decreases to a fourth weight 0 after t=several months. The generic stereotype has an initial weight 1.0 at a start time t=0, a first weight 0.9 after t=a few hours, a second weight 0.7 after t=1 day, which steadily decreases to a third weight 0.1 after t=1 week, and which further steadily decreases to a fourth weight 0 after t=several months. The user profile has an initial weight 0 at the start time t=0, a first weight 0 after t=a few hours, a second weight 0.1 after t=1 day, which steadily increases to a third weight 0.5 after t=1 week, and which further steadily increases to a fourth weight 1 after t=several months.

To summarize and simplify, it is started with a generic stereotype profile containing word-weight pairs having all the same low weight X. The more the user uses the system, the more word-weight pairs with weight larger than X will be contained in the profiles. Therefore, the overall relevance of the initial generic word-weight pairs having weight X decreases over time.

If the recommendation system does not receive the user data without a user identification tag attached to it, i.e. if there is no user identification means build-in into the device or available to the device, which features the adaptive user profile, normally the user profile actually contains a linear combination of many sub-user profiles, i.e. of all users using the system. According to the present invention preferably these sub-user profiles are separated from the multi-user profile, i.e. from the linear combination of the many sub-user profiles. According to the present invention the separation and the selection of the proper user profile is performed based on the user features, e.g. on side information like time of day or time of the week. The separation of a user profile into two sub-profiles is preferably performed as described in the following.

As mentioned above, the user profile in itself is defined by a set of weighted keywords from the EPG data of the shows that the user has actively watched. In order to find out a proper split according to the user features, e.g. using a side information feature like time-of-day, a tentative split along an arbitrary time-off-day is performed and two sub-user profiles are tentatively generated. These are checked for their relative difference and the difference is stored. Then, a next tentative split along another time-of-day is performed and again the difference is evaluated and stored, and so on. After all possible splits (or a reasonable number of splits, have been tried, the split yielding the highest difference between the two sub-user profiles is selected and the difference between the two sub-user profiles is analysed. If it exceeds a predefined threshold, a split of the multi-user profile is done, otherwise the multi-user profile remains unchanged, since it seems to be related to one user only in respect to this user feature.

The difference between two sub-user profiles can be computed by looking at the user profile as a discrete probability distribution over the keywords that are contained therein. After the tentative split, there will be two such discrete probability distributions. The difference between these two can be computed using the symmetrized Kullback-Leibler-distance sum (Pi*log(Pi/Pj)), where events which happen zero times should be replaced by one virtual occurrence, both to avoid numerical problems and to avoid overstating the importance of singleton events.

FIG. 4b exemplary shows such a split, wherein after t>6 months a split of the multi-user specific profile, e.g. that generated according to FIG. 4a, is split into N sub-profiles, i.e. from a user profile 9 a first sub-user profile $10_1$, a second sub-user profile $10_2$, and so forth until an $N^{th}$ sub-user profile $10_N$ is generated. The generation of more than two sub-user profiles is performed by repeating the above-described procedures of splitting a user profile into two sub-user profiles on basis of each then generated sub-user profile, i.e splitting a sub-user profile into two new sub-user profiles, and so forth.

In the following a third aspect of the present invention is described according to which more appropriate suggestions for an individual user can be made on basis of user features to avoid too general suggestions that do not fit the current situation. As an example, a certain user might like sports, thrillers and news, but when being together with friends, they also watch game shows. During the week the user usually only watches news and particular sports events, but no thrillers and game shows. The user watches these only during the weekend. The user profile and/or history thus include all four topics. Getting always game shows and thrillers suggested from the system is a bit annoying during the week, because the user never watches these during the week. On the weekend however, it is very useful.

Therefore, the present invention provides a means to interactively influence the suggestions made by the system to specifically ask, e.g. for some suggestions for the weekend or for some game shows right now etc. According to the present invention the specification is performed according to an actual situation of the user represented on basis of the user features, e.g. by time of day, day of week (tonight, tomorrow night, weekend), genre, specific shows, mood of the user, holidays, guests, suggestions for family, for myself, everything until tomorrow night, etc. The mood of the user might be detected automatically from audio, i.e. speech, or vision, i.e. mimic camera, information or other biometric sensor attached directly to the body.

Figure 5A:
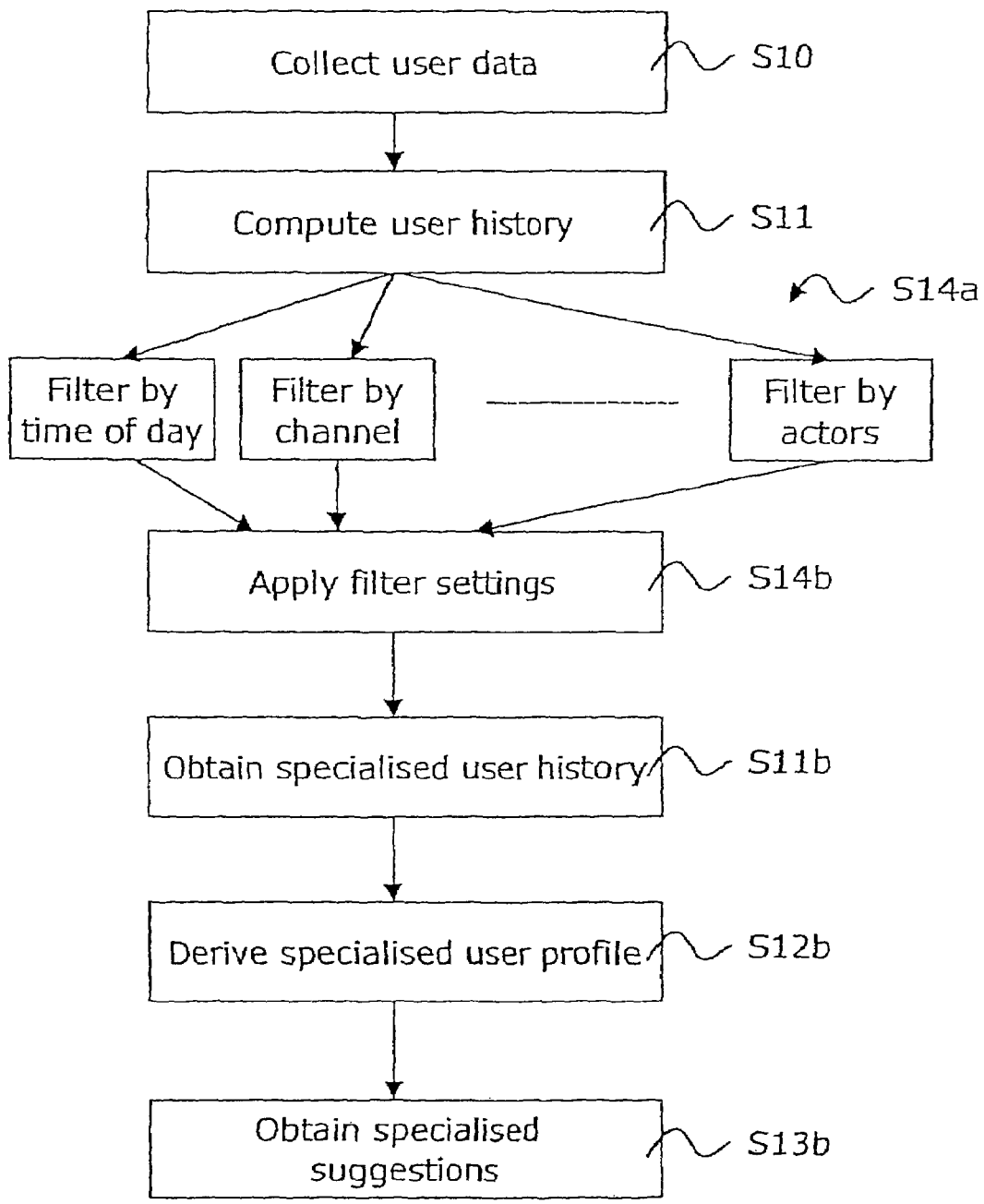
FIG. 5a to 5c show three possibilities to interactively influence a suggestion engine according to a third aspect of the present invention.

In general, as mentioned above, the user history contains all the information about TV shows the user has watched, i.e. EPG article, title, genre, time, date, director, artist, etc. The user profile contains weighted keywords which describe his viewing interests and which are the basis for the actual search in the EPG in order to make a specific suggestion. One possible way to implement the means to interactively influence the suggestions according to the present invention, in the following referred to as interactive suggestion engine, is to first filter the user history based on the specific actual situation, or request, from the user, e.g. movie on the weekend, and to compute that in a specific user profile based on the filtered history, as it is shown in FIG. 5a. In a first step S10, which corresponds to the first step S1 as shown in FIG. 3a, the user data is collected. Then, in a second step S11, which corresponds to the second step S2 (not shown in FIG. 3) as shown in FIG. 3a, the full user history is computed. Thereafter, in a first filtering step 14a filter settings are generated according to which the user history should be filtered, and in a following second filtering step 14b these filter settings are applied to obtain thereafter in a step S11b a specialized user history. Based on this specialized user history a specialized user profile is derived in a following step S12b and based thereon finally specialized suggestions are obtained in a final step S13b.

Of course, also the generated specific user profile can be combined with the generic user profile computed with the entire history, with the generic stereotype profile or with special stereotype profiles by some weighting mechanism.

Figure 5B:
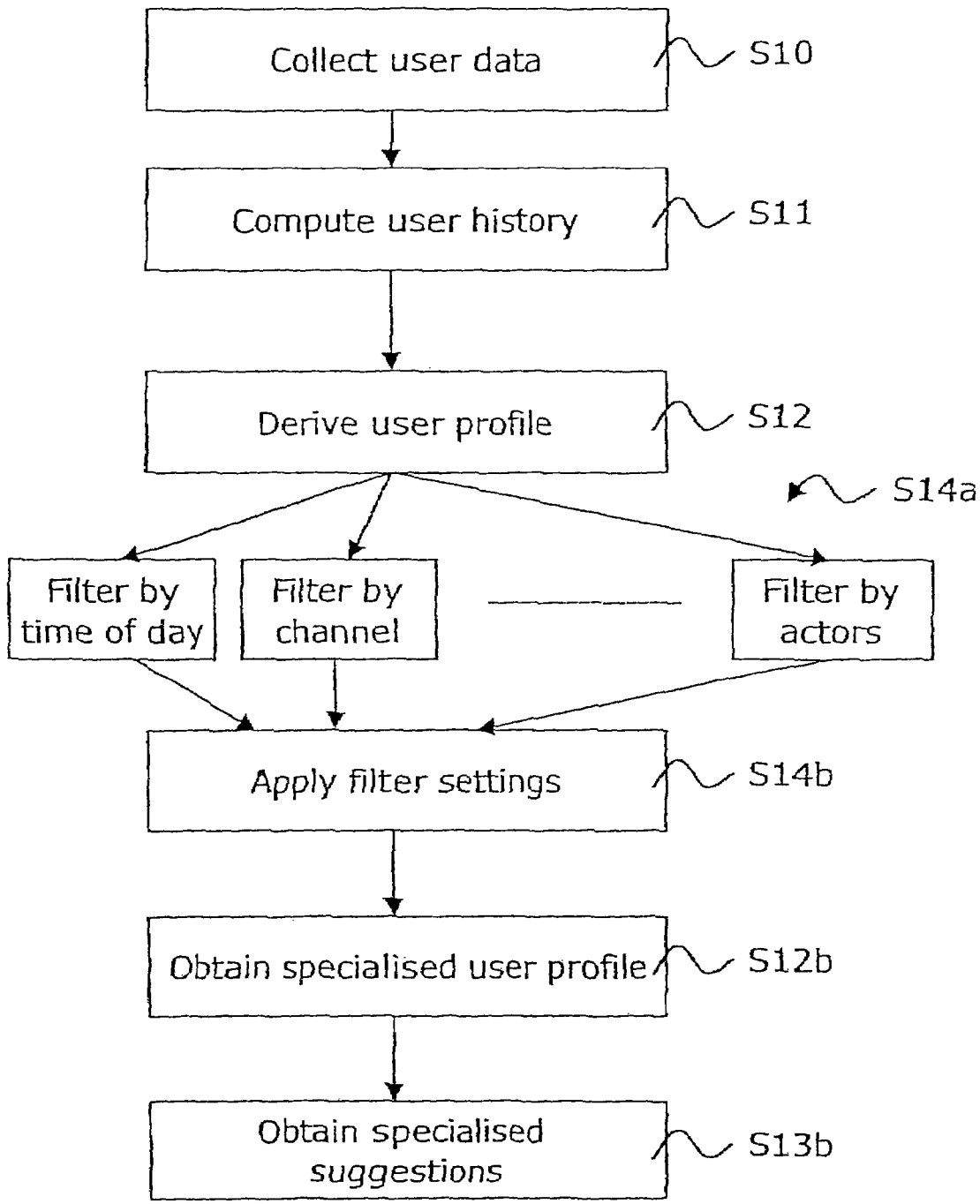

Alternatively different user profiles might be created for the same user in respect to the viewing behaviour in different situations, i.e. a specialized user profile might be obtained by the filtering. This situation is shown in FIG. 5b, which shows that in a first step S10, which corresponds to the first step S1 as shown in FIG. 3a, user data is collected and in a following second step S11, which corresponds to the second step S2 as shown in FIG. 3a, the user history is computed, whereupon in a following step S12, which corresponds to the third and fourth steps S3 and S4 as shown in FIGS. 3a and 3b, the full user profile is derived. Thereafter, the first filtering step S14a to set up the filter settings according to which the user profile should be filtered and the following second filtering step S14b to apply the filter settings are performed to obtain thereafter in a step S12b a specialized user profile based on which in a final step S13b specialized suggestions are obtained. This technique can also be used to differentiate between various profiles for different family members, as the one shown and described in connection with FIG. 5a. The identity of a user could also be determined by speaker identification or other biometric techniques, as described above.

Figure 5C:
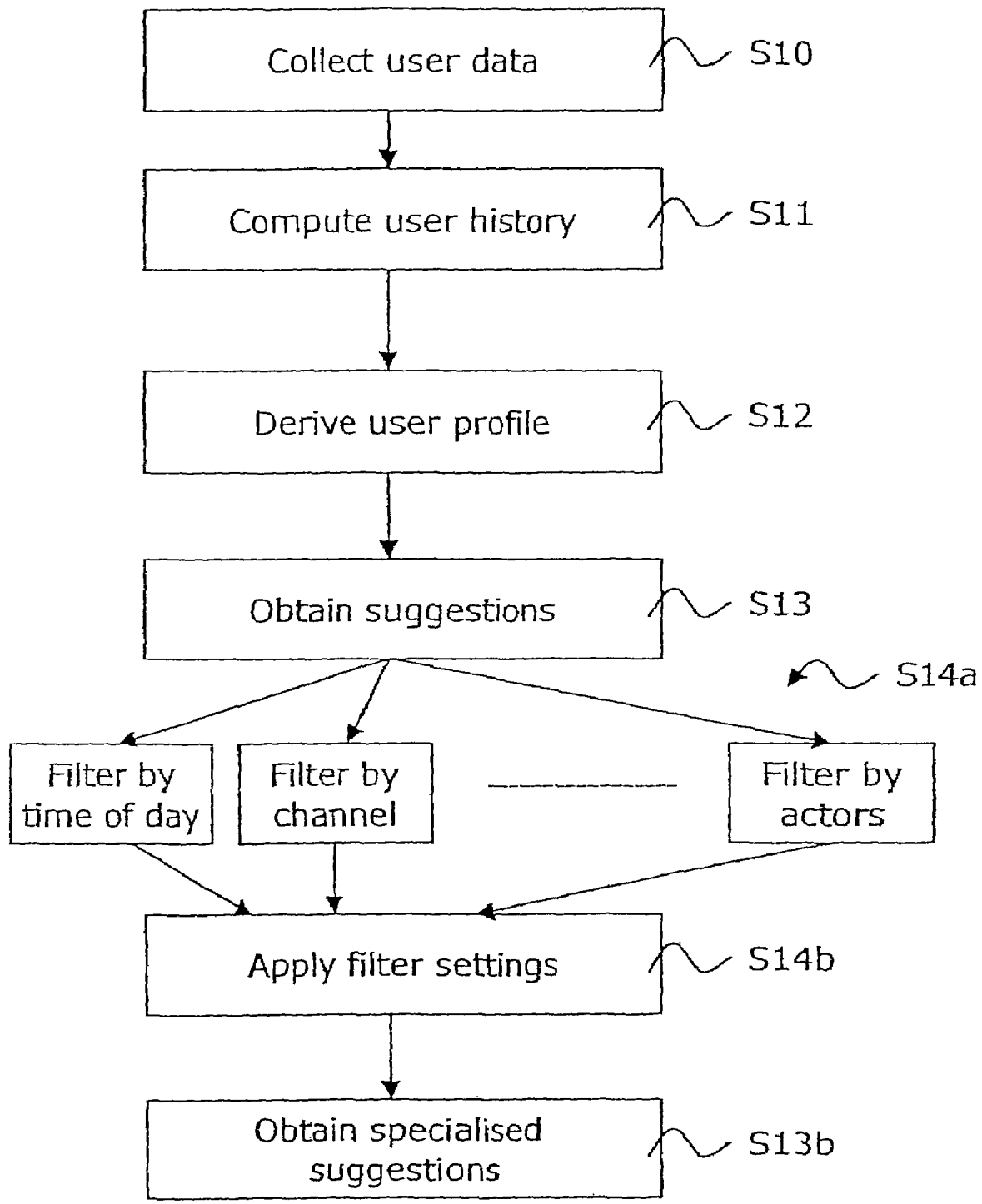

Another possibility is to compute all suggestions as usual, i.e. as shown and described in connection with FIGS. 3a to 3c, using a user profile that contains everything, i.e. thriller, news, sports and game shows. The resulting set of suggestions is then filtered based on the current requirements of the user. This case is shown in FIG. 5c, in which first the user data is collected in a first step S10, which corresponds to the first step S1 shown in FIG. 3a, thereafter the user history is computed in a second step S11, which corresponds to the second step S2 shown in FIG. 3a, based thereon the user profile is derived in a following step S12, which corresponds to the third and fourth steps S3 and S4 in FIGS. 3a and 3b, and based thereon the suggestions are obtained in a step S13, which corresponds to the fifth step S5 shown in FIG. 3c. The first filtering step S14a to set up the filter settings is only performed after the suggestions are obtained and the filter settings are set up in respect to the obtained suggestions. In the following second filtering step S14b the filter settings are applied to obtain in a final step S13b the specialized suggestions.

In both latter cases the user profile keeps the information that the user watches thrillers on Saturday and Sunday only and news and sports during the week etc., and either the query is composed such that only the relevant factors are taken into account, as it is shown and described in connection with FIG. 5b, all the query is done as before using the complete profile and the results are then filtered later, as it is shown and described in connection with FIG. 5c.

As mentioned above, the first possibility shown and described in connection with FIG. 5a is to use only the relevant parts from the history and to compute a new user profile therefrom.

Of course, the current requirements of the user can be explicitly entered by the user, e.g. "show me all thrillers for tonight" or they can also be learned automatically.

According to the present invention, the suggestion engine can react appropriately to user requests, e.g. "any series" in contrast to "any series I'm used to watch".

Furthermore, the system learns if a user watches a specific show being broadcasted seldom (e.g. every 2 months) almost every time. In that case even if this show would be suggested based on the profile it would be suggested to the user based on above specific rules.

What is claimed is:

1. A method for providing program suggestions to a user based on electronic program guides (EPGs), comprising:
   retrieving electronic program guide articles from an electronic program guide articles database; and
   suggesting at least one electronic program guide article to the user based on the retrieved electronic program guide articles and based on a user profile,
   wherein the user profile corresponds to a generic stereotype user profile, when providing a suggestion for the first time, to a linear combination of the generic stereotype user profile, at least one specific stereotype profile, and an individual user profile during a first predetermined period during the collection of data, and to the individual user profile afterwards, wherein during the first predetermined period, a first weighting factor of the at least one specific stereotype profile is first increased and then decreased and a second weighting factor of the generic stereotype user profile is continuously decreased,
   wherein the generic stereotype user profile describes an average interest in everything and the specific stereotype user profile defines interests of a user who focuses on a specific topic, and
   wherein the user profile comprises a list of word-weight pairs, wherein the weights are computed based on user features that represent a typical general behaviour.

2. The method according to claim 1, wherein the user features are influenced from a user history.

3. The method according to claim 2, wherein the user history comprises electronic program guide articles corresponding to programs that the user has previously watched.

4. The method according to claim 2, wherein the user features comprise features related to the previous typical user behaviour.

5. The method according to claim 1, wherein the user features comprise one or more of the following features:
   preferred channel of audio/video program consumed by the user;
   typical time to consume an audio/video program by the user;
   length of consuming an audio/video program by the user in relation to the total length of the audio/video program;
   time of beginning the consuming an audio/video program by the user in relation to a start time of the audio/video program;
   typical length of consuming an audio video program by the user in relation to the time of consuming;
   relation between how often a particular audio/video program is consumable and how often it is consumed by the user;
   general audio/video program consuming behaviour of the user, in particular in relation to a switch-on time and length of a used audio/video device;
   audio/video programs recorded by the user;
   time duration between the recording of a particular audio/video program by the user and the consuming of the audio/video program by the user;
   actual mood of the user;
   actual wish of audio/video program entered by the user;
   year of production of an audio/video program consumed by the user;
   director and/or actor and/or group of actors of an audio/video program consumed by the user;
   type of an audio/video program consumed by the user; and/or
   title of an audio/video program consumed by the user.

6. The method according to claim 1, further comprising:
   dividing the user profile into sub user profiles according to characteristics of stereotype user profiles.

7. The method according to claim 1, further comprising:
   determining words to be included in the list of word-weight pairs on basis of words included in program descriptions of previous selections by the user.

8. The method according to claim 7, further comprising:
determining further words to be included in the list of word-weight pairs on basis of a database evaluation of co-occurrences of words already included in the list.

9. The method according to claim 7, further comprising:
computing a weight of a word to be included in the list of word-weight pairs on a basis of a comparison of an inverse document frequency of the word with respect to all available program descriptions and an inverse document frequency of the word with respect to program descriptions of previous selections by the user.

10. The method according to claim 7, further comprising:
computing weights of words to be included in the list of word-weight pairs as a product of:
importance of the word with respect to all program descriptions of previous selections by the user,
and at least one of the following terms:
a constant term, in particular one;
importance of the word with respect to the program description in which the word is included;
importance of the word with respect to all available program descriptions; and
a correctional factor that depends on the length of the program description in which the word is included and the frequency of the word in this program description.

11. The method according to claim 10, wherein the importance of a word with respect to all program descriptions of previous selections by the user is determined on a basis of the portion of the word in the set of all words of the program descriptions of previous selections by the user.

12. The method according to claim 11, wherein the importance of a word with respect to all program descriptions of previous selections by the user is determined under consideration of the program description in which the word is included.

13. The method according to claim 10, wherein the importance of the word with respect to the program description in which the word is included is determined on a basis of occurrences of the word in the program description.

14. The method according to claim 10, wherein the importance of the word with respect to all available program descriptions is determined on basis of its inverse document frequency in respect to all available program descriptions.

15. The method according to claim 14, wherein the importance of a word with respect to all available program descriptions is determined under consideration of the program description in which the word is included.

16. The method according to claim 10, further comprising:
computing weights of words to be included in the list of word-weight pairs according to the following formula:

$$w_i(t) = \left(1 + \frac{1}{2}\log\left(\frac{f_{i,t}}{f_i+1}+1\right)\right) \cdot a \cdot \log\left(\frac{N-f_t}{f_t}\right) \cdot \left(\frac{f_{i,t}}{f_{i,t}+\sqrt{f_i}/\mathrm{avg}(\sqrt{f_i})}\right),$$

wherein $w_i(t)$ is the weight of a word t in a program description i, a is the importance of the word t in the all program descriptions of previous selections by the user, t is the word, $f_{i,t}$ is the number of occurrences of the word t in the program description i, $f_i$ is the document length of the program description i, $f_t$ is the number of program descriptions containing the word t, and N is the number of program descriptions in the database.

17. The method according to claim 10, further comprising:
normalizing a weight of a word included in the list of word-weight pairs by a behaviour of the user to stay with a selection and to switch selections off or to switch on/off just for this selection.

18. The method according to claim 10, further comprising:
normalizing a weight of a word included in the list of word-weight pairs by a behaviour of the user when to actually consume a recorded selection.

19. The method according to claim 10, further comprising:
averaging the weights $w_i(t)$ of a word over all program descriptions of previous selections by the user in which the word occurs to a weight $w(t)$ of the new profile.

20. The method according to claim 10, further comprising:
excluding words from the list of word-weight pairs which show a weight below a predetermined threshold or within a predetermined lower range of weights.

21. The method according to claim 9, further comprising:
computing a weight of a word to be included in the list of word-weight pairs by considering negative selections of the user.

22. The method according to claim 9, further comprising:
computing a weight of a word to be included in the list of word-weight pairs by considering a maximum frequency of possible user selections in respect to certain user features.

23. The method according to claim 7, wherein the created user profile is used as a query in possible future program descriptions to suggest at least one possible future selection to the user.

24. The method according to claim 17, wherein for each possible future program description a modified OKAPI weight is computed, wherein each matching word has its weight as a co-factor so that the search result is influenced according to the user profile.

25. Method according to claim 24, wherein the modified OKAPI weight is computed according to the following formula:

$$OKA_{modified}(q, i) = \sum_{t \in q \land t \in i} w(t) \cdot \log\left(\frac{N-f_i}{f_i}\right) \cdot \left(\frac{f_{i,t}}{f_{i,t}+\sqrt{f_i}\mathrm{avg}(\sqrt{f_i})}\right),$$

wherein w(t) is the weight of a word t over all program descriptions of previous selections by the user, q is a query built according to the user profile, i are all program descriptions of possible future selections, w(t) is the weight of the word t, $f_{i,t}$ is the number of occurrences of the word t in the program description i, $f_i$ is the document length of the program description i, $f_t$ is the number of program descriptions containing the word t, and N is the number of program descriptions in the database.

26. The method according to claim 24, wherein the modified OKAPI weight is computed according to the following formula;

$$OKA_{modified}(q, i) = \sum_{t \in q \land t \in i} w(t)) \cdot \left(1 + \frac{1}{2}\log \cdot \left(\frac{f_{i,t}+1}{f_i+1}\right)\right),$$

wherein w(t) is the weight of a word t over all program descriptions of previous selections by the user, q is a query built according to the user profile, i are all program descriptions of possible future selections, w(t) is the weight of the word t, $f_{i,t}$ is the number of occurrences of the word t in the program description i, and $f_i$ is the document length of the program description i.

27. The method according to claim 1, wherein a weight with which a specific stereotype user profile is considered during the linear combination to provide the suggestion is computed by matching the user selections with the data in the respective specific stereotype and increasing the weight of the stereotype if a match is found.

28. The method according to claim 1, wherein
the user profile is created from a multi-user profile that comprises a list of word-weight pairs,
wherein the multi-user profile is splitted at least once according to the user features.

29. The method according to claim 28, wherein for splitting the multi-user profile the following are performed:
performing a tentative split according to user features to generate a first and a second sub user profiles;
calculating the relative difference between the two sub user profiles;
performing a tentative split and calculating the relative difference until all or a predetermined number of tentative splits are performed; and
splitting the multi-user profile according to a tentative split that yields a highest relative difference in case the relative difference lies above a predetermined threshold.

30. The method according to claim 29, wherein the relative difference is calculated by calculating a difference of a first discrete probability distribution of the first sub user profile over the user features that are contained therein and of a second discrete probability distribution of the second sub user profile over the user features that are contained therein.

31. The method according to claim 30, wherein the difference of the two discrete probability distributions is calculated using the symmetrized Kulback Leibler-distance sum, where events which happen zero times are replaced by one virtual occurrence or where only events which happen at least once in both distributions are taken into account.

32. The method according to claim 1, wherein a general key structure includes a forgetting factor.

33. The method according to claim 1, wherein a future program comprises a stored personal content.

34. The method according to claim 1, wherein the method is used in an audio/video program suggestion engine.

35. The method according to claim 34, wherein the audio/video program suggestion engine is internet based.

36. The method according to claim 1, wherein the method is client based.

37. A computer program product, comprising computer program means adapted to perform the method as defined in claim 1 when being executed on a computer, micro processor, digital signal processor, including home server, set-top-box, TV, VCR, PDA.

38. A computer readable storage medium, storing thereon a computer program product according to claim 37.

39. A suggestion engine to specify a suggestion for a next selection of a user, which suggestion is determined based on a method as defined in claim 1.

* * * * *